Oct. 22, 1957 J. J. ZEEGERS 2,810,470
DRIVING HEAD FOR ENDLESS CONVEYOR
Filed April 27, 1954 2 Sheets-Sheet 1

United States Patent Office 2,810,470
Patented Oct. 22, 1957

2,810,470

DRIVING HEAD FOR ENDLESS CONVEYOR

Jan J. Zeegers, Heerlen, Netherlands, assignor to Stamicarbon N. V., Heerlen, Netherlands Application April 27, 1954, Serial No. 427,770

Claims priority, application Netherlands May 1, 1953

1 Claim. (Cl. 198—204)

The present invention relates to face conveyors adapted to be installed along a mine face for conveying away material cut therefrom, and comprising a stationary trough constructed in sections and endless conveying means for moving material along the trough for delivery.

It is customary for the driving wheels at each end of the conveyor, for driving the said conveying means, to be driven by twin motors installed one on each side of the conveyor.

The need for driving motors at both ends of the conveyor driving shafts arises in view of the heavy loading involved in the conveying of material in the trough and possibly also the driving of a coal-winning or like machine along one side of the conveyor trough for cutting material from the mine face.

The driving gear at each end of the conveyor, comprising the twin motors, is fastened to the side walls of the appertaining end section of the conveyor trough. If the gear abreast of an end trough-section is unevenly supported, due, e. g., to local subsidence of the floor under one of the motors, a bending moment is exerted on the end section of the conveyor trough which has been found on occasions to distort the trough section and cause operating difficulties.

According to the present invention there is provided in or for a face conveyor comprising a stationary trough and endless conveying means for moving material along the trough for delivery, an end trough-section which is made resistant to distortion under the weight of driving gear connected to the side walls thereof by the interconnection of the said walls by vertically spaced lateral girders.

Two or more lateral girders may be provided at each of two levels or two vertically spaced girders only may be employed, the girders being preferably of box-section.

By making the end trough-section resistant to distortion under the weight of the driving gear no difficulty will arise if, in use, the motors on the opposite sides of the section are supported eccentrically or if the end of the conveyor, including the driving gear, is supported only under the end trough section, and the shafts of the driving gear and the driving shaft of the conveying means will remain in correct alignment. The end section of the conveyor trough and the abreast gear virtually form a right unit which may be cantilevered.

The lateral girders may be arranged so that a passage is left between them through which the relatively slack part of the endless conveying means passing off the driving wheels may extend.

Figure 1:
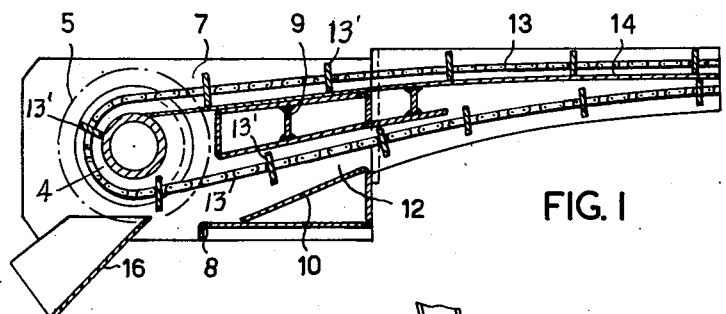
Figure 2:
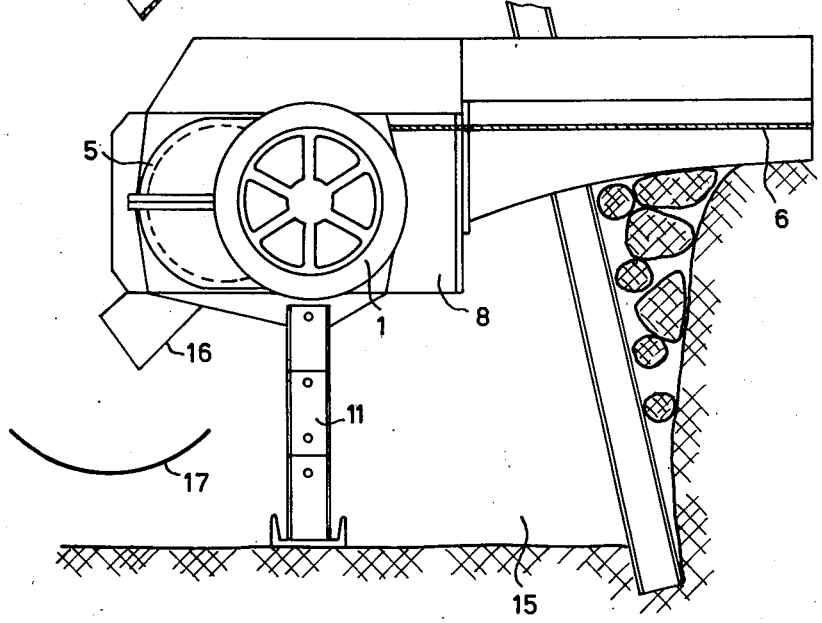
Figure 3:
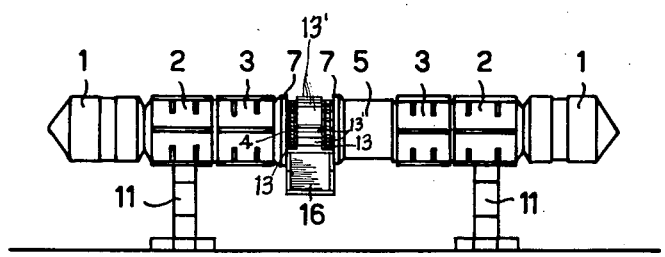
Figure 4:
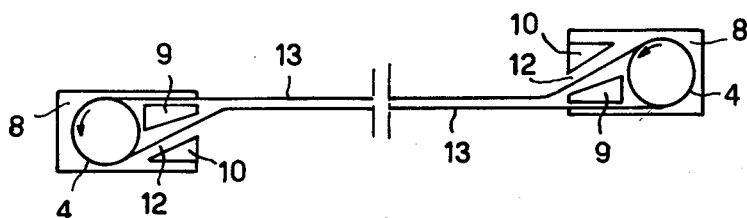

In order that the invention may be the more readily understood, reference is hereinafter made to the conveyor illustrated diagrammatically and by way of example in the accompanying drawings in which, Fig. 1 is a longitudinal section through an end section of the conveyor trough, Fig. 2 is a side elevation of the driving station in the gate road, Fig. 3 is an end elevation of the conveyor at the driving station and Fig. 4 is a diagram of the arrangement of the complete conveyor.

The conveyor comprises a trough, one end section of which is designated 8, and conveying means in the form of two endless chains 13 which carry lateral scrapers 13' extending between the chains. In use, the scrapers for the time being in the upper reach push material loaded into the trough, along the bottom 14 thereof to the delivery end of the conveyor where the material is dumped through a chute 16 onto a conveyor belt 17 installed in the gate road 15.

At the delivery end, the conveyor is driven by two motors 1 which drive the driving wheels of the endless conveying means via reduction gears 3 to which the motors are coupled by couplings 2. The right hand motor (Fig. 3) also drives a drum 5 on which is wound a haulage chain 6 of a coal or like winning machine (not shown) which, in use, is reciprocated along the mine face.

The driving gear is attached to the side walls 7 of the end section 8 of the conveyor trough. These side walls are interconnected by transverse girders 9 and 10 of box section. The trough section 8 is resistant to deformation under the bending stresses which are imposed if the end of the conveyor, with the driving gear, is supported only under the end trough-section. The driving gear, comprising the twin motors, forms a rigid unit with the said end trough-section, which unit does not require a foundation plate and can be supported at two spaced points, as by supports 11.

Between the girders 9 and 10 there is a passage 12 through which passes the relatively slack part of the conveying means running off the driving wheels 4.

As shown in Fig. 4 the driving wheels 4 at the two ends of the conveyor are placed at different levels and so that the upper reach of the conveying means substantially maintains the same general line of travel in passing from the major, medial, length of the trough onto the driving wheels at the delivery end and the lower reach of the said means substantially maintains the same general line of travel in passing from the said medial length of the trough onto the driving wheels at the other end of the conveyor. This feature is described and claimed in my co-pending application Serial No. 427,769, filed April 27, 1954.

In the conveyor illustrated in the drawing, the two end sections of the conveyor are of identical construction and the right hand end trough-section (Fig. 4) is placed in inverted end for end orientation with respect to the left hand end section. Thus, also at the said right hand end of the conveyor, it is the relatively slack part of the conveying means, passing off the driving wheels, which extends through the passage 12 between the lateral girders.

I claim:

In a face conveyor having a stationary trough, a pair of spaced rotary members at the ends of said trough and endless conveying means trained about said members so as to form a lower reach and an upper reach within said trough for moving material therealong to be delivered at one end thereof; the improvement comprising an end trough-section arranged to be supported above a horizontal supporting surface by suspension between laterally spaced supports for rotatably receiving one of said rotary members and for guiding the reach running off of said one rotary member, said section comprising a pair of laterally spaced upright side members from which said section is suspended, said side members having means therein for rotatably receiving said rotary member, and means rigidly interconnecting said side members for preventing distortion therebetween as a result of suspended weight carried thereby, said last-mentioned means comprising a pair of vertically spaced girders of box-like section rigidly connected to said side members, said girders including upper and lower plates inclined in the same direction defining a passage through which the conveyor reach running off of said one rotary member passes, said lower plate serving to guide the reach passing through said passage, said end trough-section being invertible so as to alternatively receive the other of said rotary members so that said upper plate serves to guide the conveyor reach passing through said passage.

References Cited in the file of this patent

UNITED STATES PATENTS

| | | |
|---|---|---|
| 2,386,619 | Long et al. | Oct. 9, 1945 |
| 2,591,089 | Moon | Apr. 1, 1952 |
| 2,649,188 | Duncan | Aug. 18, 1953 |